(12) United States Patent
Chen et al.

(10) Patent No.: US 6,833,948 B2
(45) Date of Patent: Dec. 21, 2004

(54) METHOD FOR IMPLEMENTING POWER EQUALIZATION OF DENSE WAVELENGTH DIVISION MULTIPLEXING SYSTEM

(75) Inventors: Juan Chen, Shenzhen (CN); Changchun Li, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/250,715

(22) PCT Filed: Jun. 26, 2002

(86) PCT No.: PCT/CN02/00442
§ 371 (c)(1),
(2), (4) Date: Jul. 8, 2003

(87) PCT Pub. No.: WO03/043249
PCT Pub. Date: May 22, 2003

(65) Prior Publication Data
US 2004/0047552 A1 Mar. 11, 2004

(30) Foreign Application Priority Data
Aug. 3, 2001 (CN) .......................... 01124672 A

(51) Int. Cl.[7] .............................................. H01S 3/00
(52) U.S. Cl. .................. 359/337.1; 359/337.4
(58) Field of Search .................. 359/337.1, 337.4; 398/160

(56) References Cited

U.S. PATENT DOCUMENTS 6,049,416 A * 4/2000 Srivastava et al. ....... 359/337.1
6,236,481 B1   5/2001 Laor
6,236,498 B1 * 5/2001 Freeman et al. ......... 359/337.1
6,359,726 B1 * 3/2002 Onaka et al. ............ 359/337.1
6,535,330 B1 * 3/2003 Lelic et al. ............ 359/337.13

FOREIGN PATENT DOCUMENTS

| CN | 1219043 A | 6/1999 |
| EP | 0942548 | 9/1999 |
| GB | 2351861 A | 1/2001 |

* cited by examiner

Primary Examiner—Mark Hellner
(74) Attorney, Agent, or Firm—Harness, Dickey & Pierce, P.L.C.

(57) ABSTRACT

The invention discloses a method for implementing power equalization of a DWDM system, comprises: Measure and calculate, respectively, a gain spectrum characteristic curve of an optical power booster amplifier unit and a loss spectrum characteristic curve of a loss device with related wavelengths in the DWDM system; Subtracting the loss spectrum characteristic curve from the gain spectrum characteristic curve to obtain a difference curve, taking the complement curve of the difference curve as a loss characteristic target curve of a GFF; Setting in the optical power booster amplifier unit a GFF having loss characteristic curve coinciding with the loss characteristic target curve. The invention synthetically considers gain spectrum of an optical power booster amplifier unit and loss spectrum of a loss device with relating wavelengths to define a loss characteristic curve which a GFF should have. In this way, optical power flatness of every channel is effectively guaranteed. Therefore, transmission link flatness of whole system is guaranteed, and channel optical power equalization property of a system is further improved.

5 Claims, 6 Drawing Sheets

METHOD FOR IMPLEMENTING POWER EQUALIZATION OF DENSE WAVELENGTH DIVISION MULTIPLEXING SYSTEM

This application is a 371 of PCT/CN02/00442 filed Jun. 26, 2002.

FIELD OF THE TECHNOLOGY

The present invention relates generally to an optical power equalization method for every channel in a Dense Wavelength Division Multiplexing (DWDM) system, and more particularly to an implementing method for improving transmission gain spectrum flatness of a DWDM system.

BACKGROUND OF THE INVENTION

Along with the rapid development of digital communication, modem telecommunication system has a relentless demand for networks of higher capacities. In optical communication area, capacities of optical fibers are tremendous. In traditional transmission networks, not matter it is space-division multiplex (SDM) or time-division multiplex (TDM) for expanding capacity, it is only a single wavelength transmission of optical signals. The bandwidth of optical fiber comparing with the single wavelength transmission is almost unlimited. In order to deploy the tremendous bandwidth resource of optical fiber and to increase capacity of optical fibers transmission, a new generation optical fiber technology, taking Dense Wavelength Division Multiplexing (DWDM) technology as a core, has been naturally developed.

Deploying the widthband and low loss properties of a single mode optical fiber, DWDM technology uses multiple wavelength optics as carriers, and allows optical signals with different wavelengths propagates simultaneously in an optical fiber. Conventionally, optical channels kept farther apart (larger spacing) and even multiplex at different windows of a fiber is called Wavelength Division Multiplexing (WDM), but channels kept less apart (smaller spacing) and multiplex at same window is called Dense Wavelength Division Multiplexing (DWDM). At present, wavelength spacing of multiplex can be nanometer level or even several tenth of one nanometer. Comparing with single channel system, DWDM technology not only greatly increases network capacity and thoroughly uses fiber bandwidth, but also has advantages such as simplicity of expanding capacity and reliability etc. Especially, the DWDM is capable of accessing multiple services directly, so it will have a bright application future.

Appearance of Erbium-Doped Fiber Amplifier (EDFA) makes that the wavelength division multiplexing technology develops rapidly. With this technology, increasing communication traffic needs only increasing more multiplexing wavelengths. Nevertheless, more multiplexing wavelengths need that amplifier has wide and flat gain spectrum, but gain spectrum of EDFA is not so flat as expected. At present, increasing multiplexing wavelengths is mainly restricted by gain bandwidth of EDFA used in a system. In 1545~1560 nm wavelength band, gain spectrum of EDFA are flatter, so in general, there is no need to flatten with Gain Flattened Filter (GFF). However, for wider wavelength band (such as 1530~1560 nm wavelength band), because of gain spectrum characteristic of EDFA, it is needed to flattened the gain with GFF. As a filter, it is required that GFF inserting loss is different for different wavelengths. If loss spectrum curve of GFF coincides with gain spectrum curve of EDFA, then wider and flatter gain spectrum can be obtained. Of course, this flattening is cost by power loss.

FIG. 1 shows a present DWDM system, which mainly includes an optical multiplexer 101, an optical power booster amplifier module 102, a transmission fiber 103, an optical link amplifier unit 104, a transmission fiber 105, an optical preamplifier unit 106 and an optical demultiplexer 107. Among them, the optical preamplifier unit 106 and the optical link amplifier unit 104 are basically the same, which mainly include an optical preamplifier (PA) module 108, a dispersion-compensating module (DCM) 109 and an optical power booster amplifier (BA) unit 110. The multichannel signals are combined at optical multiplexer 101, then pass optical power booster amplifier module 102, and enter transmission fiber 103. After some distances along the fiber, the signal enters optical link amplifier unit 104, because of compensation for power fading and dispersion. In general, the optical link amplifier unit is consisted of PA 108, DCM 109 and BA 110, among them DCM 109 mainly is a dispersion compensating fiber and is optional. After signal power has been amplified and dispersion has been compensated, the signal enters transmission fiber 105 again. After several stages of similar link, the signal enters optical preamplifier unit 106 for power amplify and dispersion compensation.

The disadvantages of present technology are: the design of GFF of EDFA used in DWDM system, only considers absorption spectrum of EDFA itself is non-flatness, without considering loss spectrum of transmission fiber or dispersion compensating fiber used in higher than 10 Gb/s speed system. If the loss spectrums of these fibers have more different under different wavelengths, the difference will be accumulated along with increasing of length, and will affect power equalization of a system. The main reason is that every channel optical power difference affected by optical fiber will increase along with length increasing. Without considering this phenomenon, optical power equalization between every channel is getting worse, when passing links are increased. Taking Leaf fiber of Corning Co. as an example for measuring, the results are as follow. FIG. 2 shows loss spectrums measured for 25 km single mode fiber. FIG. 3 shows loss spectrums measured for dispersion compensating fiber of 60 km single mode fiber. It can be seen from FIG. 2 that maximum power difference, inserted by 25 km single mode fiber, between channels is greater than 0.3 dB. Suppose a system has 8*22 dB distances with a 640 km single mode fiber; for 32 channels, the maximum difference of loss inserted by the 640 km single mode fiber will be 7.68 dB. FIG. 3 shows that, for 32 channels, insertion loss difference of dispersion compensating fiber, used to compensate 60 km single mode fiber, is approximately 1 dB. Similarly, for 32 channels in 8*22 dB system, insertion loss difference of dispersion compensating fiber, used to compensate 640 km single mode fiber, will reach 10 dB.

SUMMARY OF THE INVENTION

The invention proposes a method to raise effectively optical power flatness for a DWDM system, in order to guarantee optical power equalization of every channel.

A method for implementing power equalization for a DWDM system comprises the steps of:

a) Measure and calculate, respectively, a gain spectrum characteristic curve of an optical power booster amplifier unit and a loss spectrum characteristic curve of a loss device, having related wavelength with the optical power booster amplifier unit, in a DWDM system.

b) Subtract the loss spectrum characteristic curve from the gain spectrum characteristic curve to obtain a difference curve. Then, complement the difference curve to obtain a complementary curve. The complementary curve is defined as a loss characteristic target curve of a GFF.

c) Set a GFF having loss characteristic curve coinciding with the loss characteristic target curve in the optical power booster amplifier unit.

The method further comprises that divide, in advance, the whole DWDM system into more than one independent unit which includes at least the optical power booster amplifier unit. Then, calculate the loss characteristic target curves for GFF of every independent unit itself, respectively.

The method also further comprises: having defined an EDFA as the optical power booster amplifier unit; having defined a transmission fiber, or a dispersion compensating module, or their combination as the loss device with relating wavelength; having defined the dispersion compensating module is consisted of dispersion compensating fibers.

The invention considers gain spectrum characteristics and loss spectrum characteristics synthetically. The invention not only considers gain spectrum non-flatness of optical power booster amplifier units, but considers loss spectrum non-flatness of transmission fibers and dispersion compensating modules as well. The invention makes loss characteristic curve of a GFF is a complement of a combined gain loss spectrum characteristic curve. The invention divides a whole DWDM system into several independent units, and defines loss characteristics curve of every unit GFF, respectively. In this way, optical power flatness of every channel in each unit is effectively guaranteed, so transmission link flatness of whole system is also guaranteed, and channel optical power equalization property of whole system is greatly improved.

EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 5:
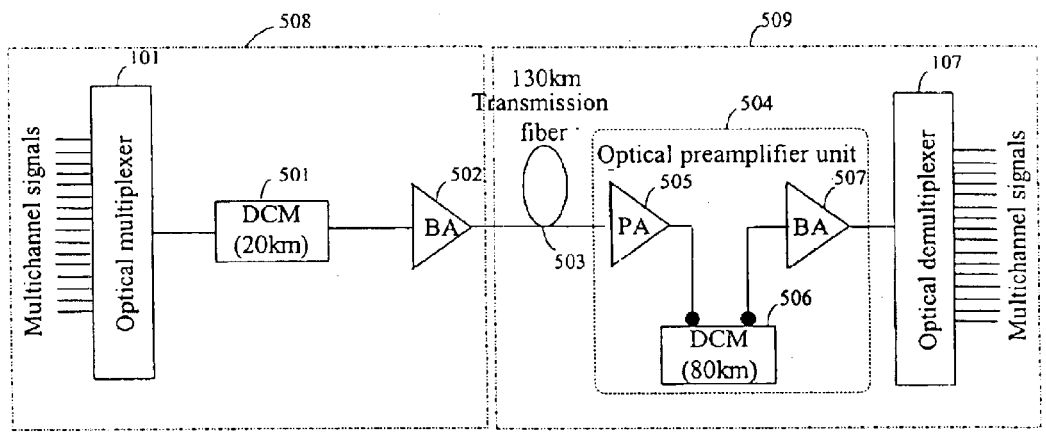
FIG. 5 is a block diagram of an embodiment DWDM system of the invention.

FIG. 5 shows an embodiment of the invention, which is a DWDM system without link amplifier unit and transmission by a 130 km G.625 fiber. The system mainly includes an optical multiplexer 101, a dispersion compensating module 501 used to compensate dispersion of a 20 km single mode fiber, an optical power booster amplifier module (BA) 502, a transmission fiber 503, an optical preamplifier unit 504 and an optical demultiplexer 107. Among them, the optical preamplifier unit 504 mainly includes: an optical preamplifier module (PA) 505, a dispersion-compensating module (DCM) 506 used to compensate dispersion of a 80 km single mode fiber and an optical power booster amplifier module (BA) 507. As there is no link amplifier unit, the system can be divided into two parts: transmitting end unit 508 and receiving end unit 509, to define loss characteristics of each part GFF.

For 10 Gb/s or higher then 10 Gb/s system, in order to have some dispersion allowance, a dispersion compensating fiber to compensate dispersion of 100 km single mode fiber is inserted to the system. In this embodiment, the dispersion compensating module 501 for compensating dispersion of 20 km single mode fiber is put on transmitting end unit 508, and the dispersion compensating module 506 for compensating dispersion of 80 km single mode fiber is put on receiving end unit 509.

At transmitting end unit 508, after combining multichannel signals in optical multiplexer, the signal passes through the dispersion compensating module 501 for compensating 20 km single mode fiber dispersion, and enters the optical power booster amplifier module 502. In this embodiment, as the length of dispersion compensating fiber for compensating 20 km single mode fiber dispersion is shorter, so it loss spectrum can be neglected. The GFF in BA 502 can only consider itself flatness, and affection of successive transmission fiber will be considered later. Therefore, the GFF loss characteristic in the transmission fiber 503 and receiving end unit 509 can be defined by synthetically considering the following factors: final flatness situation of former BA 502, 130 km transmission fiber 503, non-flattened PA 505, dispersion compensating module 506 for compensating 80 km single mode fiber dispersion and non-flattened later BA module 507 etc. In this embodiment, at first calculate and define the followings: loss spectrum of 130 km transmission fiber 503, loss spectrum of non-flattened PA 505, insertion loss of dispersion compensating module 506 for compensating 80 km single mode fiber dispersion, loss spectrum of non-flattened BA 507 etc.

Figure 1:
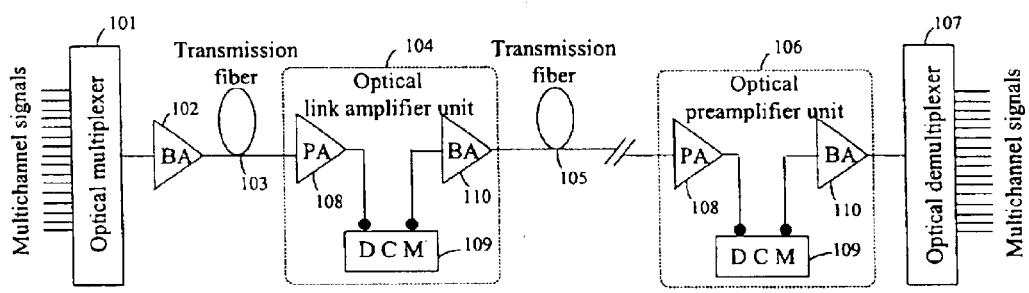
FIG. 1 is a general DWDM system block diagram.
Figure 2:
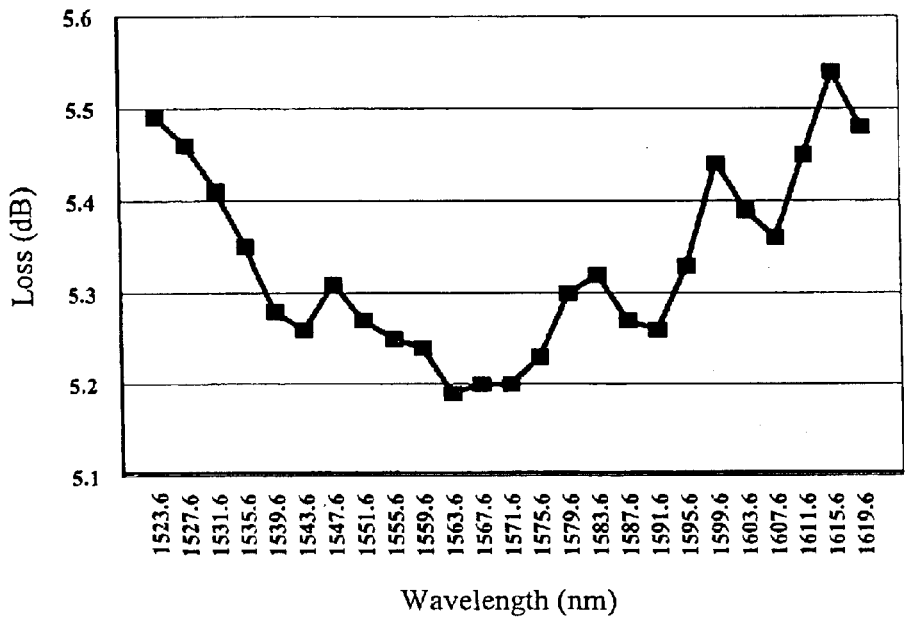
FIG. 2 is a measured loss spectrum diagram for 25 km G.652 single mode fiber.
Figure 3:
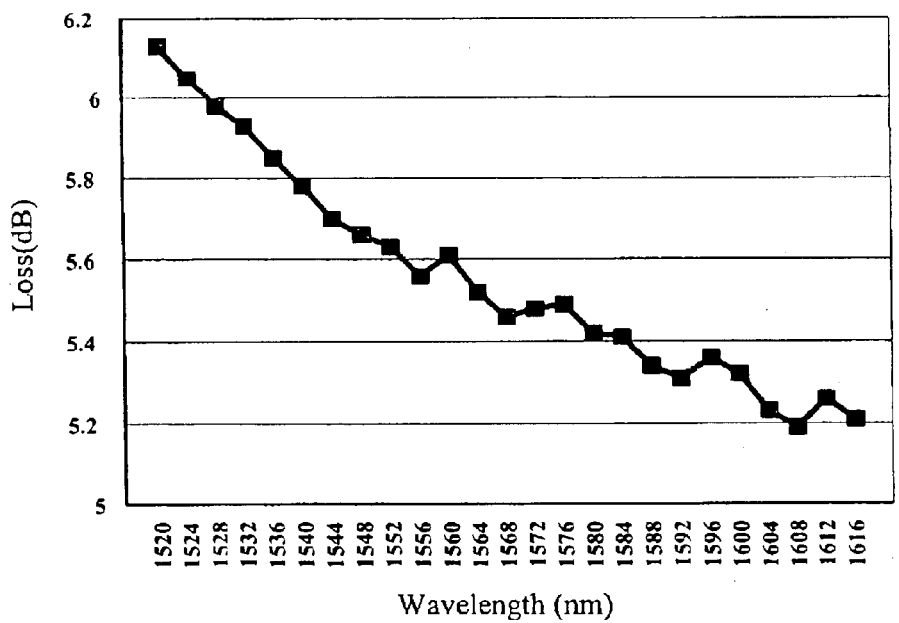
FIG. 3 is a measured loss spectrum (taking Leaf fiber as an example) diagram of a dispersion compensating fiber used to compensate dispersion of 60 km G.652 fiber.
Figure 4:
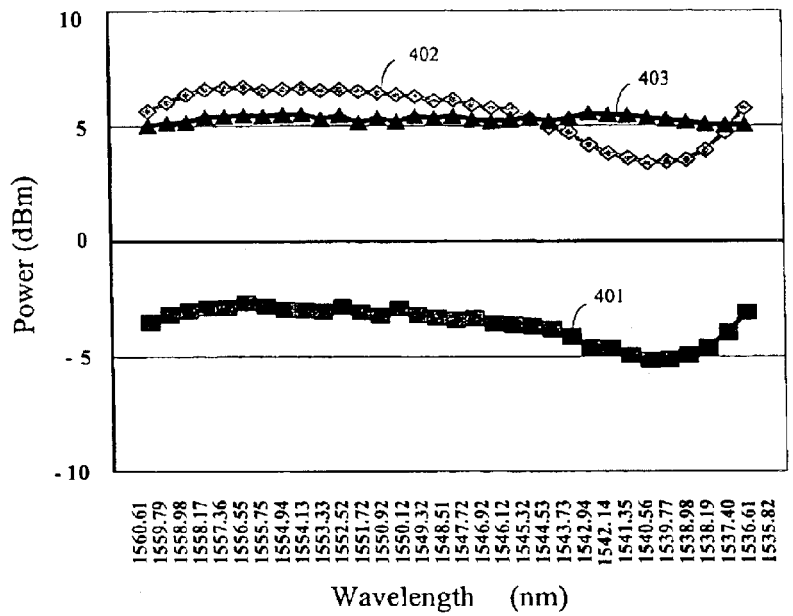
FIG. 4 is output optical power diagram of PA and BA.
Figure 6:
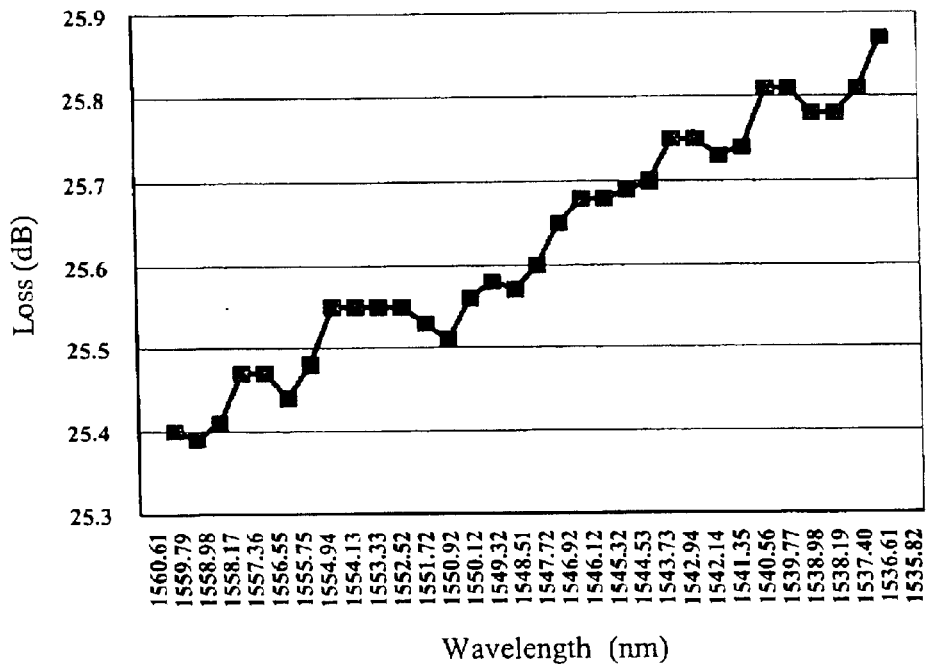
FIG. 6 is an insertion loss spectrum diagram of a 130 km G.652 fiber.
Figure 7:
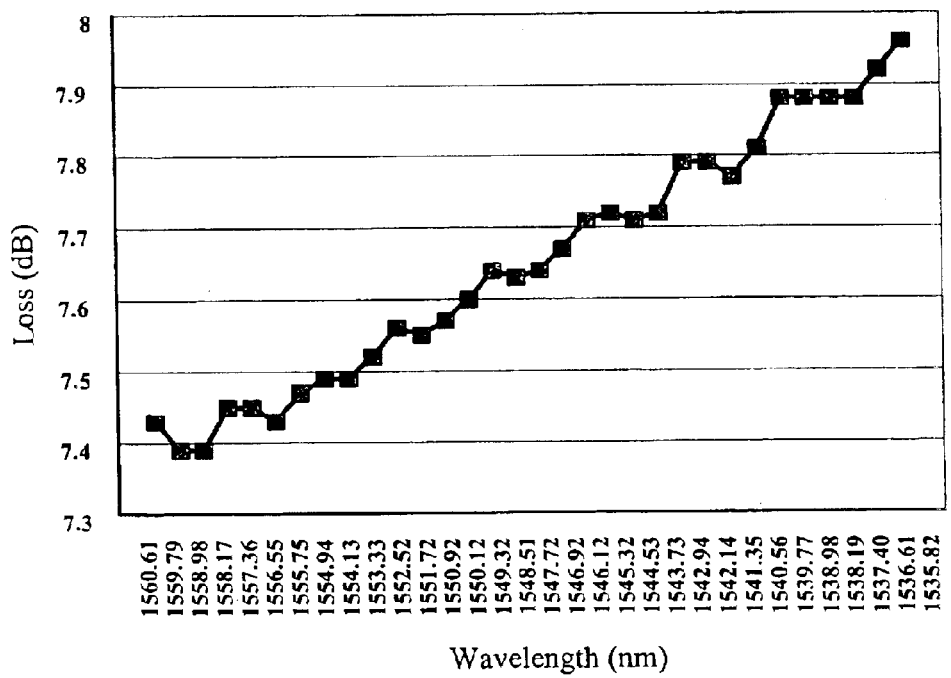
FIG. 7 is an insertion loss spectrum diagram of a dispersion compensating fiber used to compensate dispersion of an 80 km single mode fiber.

By calculating and measuring, the following curves can be obtained. FIG. 6 shows loss spectrum of 130 km G.652 transmission fiber 503 at 1530~1560 nm wavelength band, and the non-flatness is about 0.8 dB. FIG. 7 shows insertion loss difference between channels inserted by dispersion compensating module 506 for compensating 80 km fiber dispersion, and the non-flatness is about 0.32 dB. FIG. 4 shows output power differences for non-flattened PA 505, non-flattened BA 507, flattened BA 502. In FIG. 4, curve 401 represents the output optical power flatness of PA 505, curve 402 represents the output optical power flatness of non-flattened BA 507, and curve 403 represents the output optical power flatness of BA 502 having been flattened. Then, through calculation, the insertion loss of transmission fiber 503, the output optical power of PA 505, the output optical power of BA 507 and the insertion loss of DCM 506 used to compensate dispersion of the 80 km fiber, in the receiving end unit 509, are all considered. Subtract loss spectrum characteristic curve of transmission fiber 503 and DCM 506 from gain spectrum characteristic curve of PA 505 and BA 507, i.e. output optical power of whole unit before flattening=output optical power of PA 505 before flattening+ output optical power of BA 507 before flattening−insertion loss of 130 km G.652 transmission fiber 503−insertion loss of DCM 506 for compensating dispersion of 80 km fiber. The calculated power points set, at each wavelength, is a gain spectrum characteristic curve of the whole unit output optical power before flattening.

Figure 8:
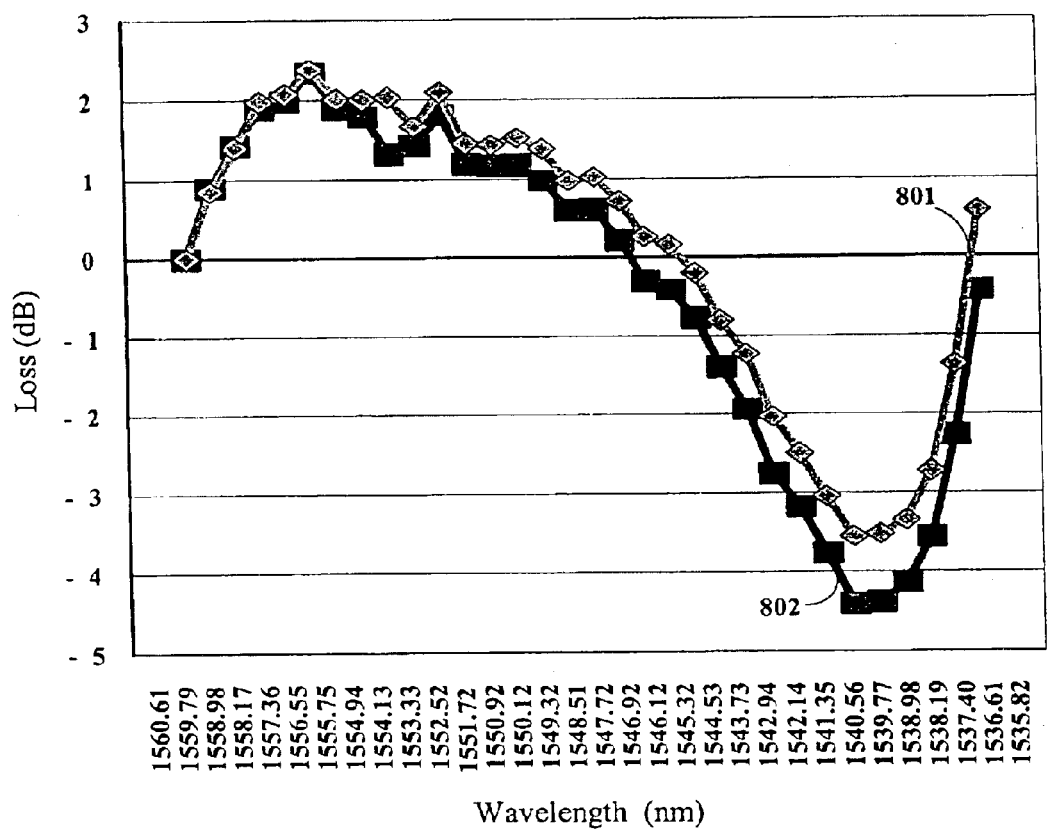
FIG. 8 is an insertion loss spectrum diagram of a GFF designed under two conditions: with fiber affection and without fiber affection.
Figure 9:
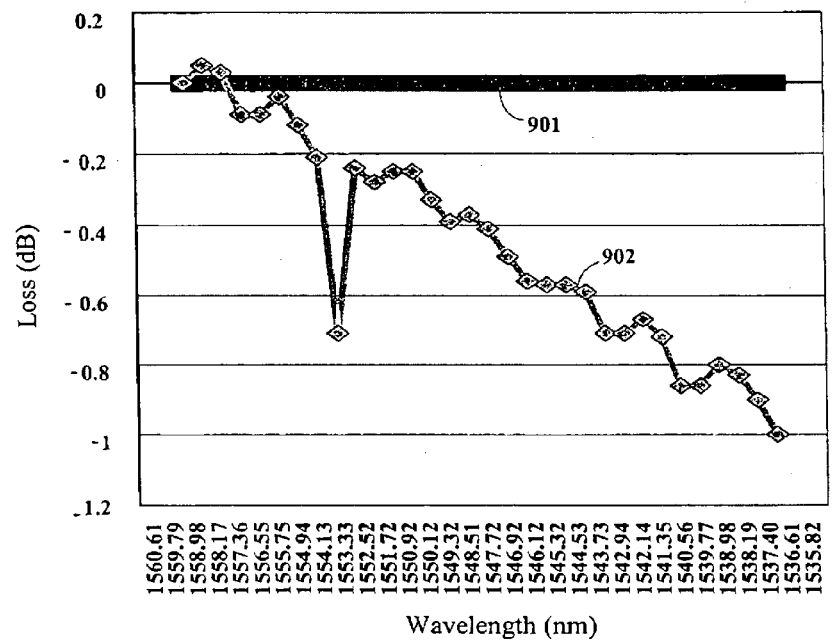
FIG. 9 is a comparison diagram of power equalization characteristics for every channel of a system when the GFF is designed under two conditions: with fiber affection and without fiber affection.

At this moment, a complement curve of the combined gain spectrum characteristic curve is taken as the loss spectrum curve of GFF in the system, as shown in FIG. 8. In FIG. 8, the curve 801 is a GFF loss spectrum curve without considering the loss spectrum of transmission fiber and dispersion compensating fiber, the curve 802 is a GFF loss spectrum curve with considering fiber affection. Comparing these two curves can be seen that larger difference is at short wavelengths. The GFF loss spectrum curve having been defined is used as a loss characteristic target curve. A GFF coincides with the loss characteristic target curve is manufactured and set in BA 507, i.e. the EFA of this embodiment. After deploying the said GFF, optical power output curves of every channel are measured and shown in FIG. 9. FIG. 9 shows comparison of the power equalization characteristics of every channel before and after deploying optimized GFF, as shown by curves 902 and 901 respectively. Obviously, considering loss spectrum of fiber links and optimizing loss characteristic curve of GFF better improves the channel optical power equalization property.

Figure 10:
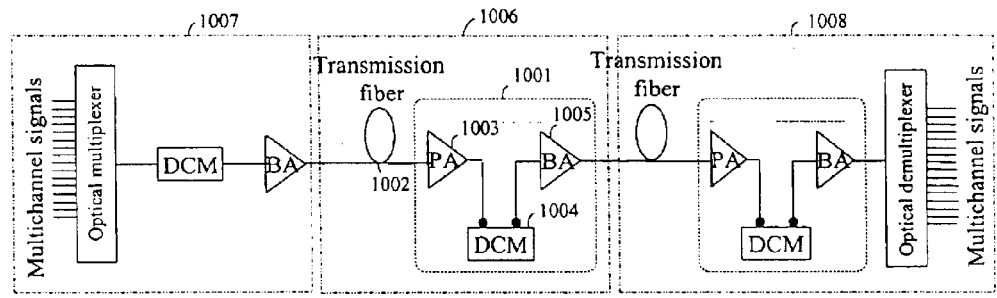
FIG. 10 is a block diagram of another embodiment DWDM system of the invention.

In the embodiment mentioned above, link repeated units have not been considered. FIG. 10 shows block diagram of a DWDM system with a link repeated unit. For simplicity, the system is formed by adding a link amplifier unit 1001 and a corresponding transmission fiber 1002 to the previous embodiment. The link amplifier unit 1001 is consisted of PA 1003, DCM 1004 and BA 1005. The transmission fiber 1002 and the link amplifier unit 1001 compose the repeated unit 1006. Other parts of the system can be divided into transmitting end unit 1007 and receiving end unit 1008, as in the previous embodiment, and the calculation method for these two units is same as before.

In repeated unit 1006, first calculate and define the followings: the loss spectrum of transmission fiber 1002, the gain spectrum of non-flattened PA 1003, the insertion loss of DCM 1004 for compensating dispersion of single mode fiber, the gain spectrum of non-flattened BA 1005. Then, subtract loss spectrum characteristics curve of transmission fiber 1002 and DCM 1004 from gain spectrum characteristics curve of PA 1003 and BA 1005, i.e. output optical power of whole unit before flattening=output optical power of PA 1003 before flattening+output optical power of BA 1005 before flattening−insertion loss of transmission fiber 1002− insertion loss of DCM 1004. The calculated power points set, at each wavelength, is a gain spectrum characteristic curve of whole unit output optical power before flattening. A complement curve of the combined gain spectrum characteristic curve is used as the target curve of GFF loss spectrum of the repeated unit 1006. Manufacture a GFF which coincides the loss spectrum target curve and set in BA 1005, then gain balance of the repeated unit 1006 is implemented. Combining with gain balance adjustment of the transmitting end unit 1007 and the receiving end unit 1008 in the previous embodiment, gain balance of the whole DWDM system can be implemented. A system with multiple repeated units can be dealt with the analogy of this.

All mentioned above are only the better embodiments of the invention, they are by no means to limit the protection scope of the invention.

What is claimed is:

1. A method for implementing power equalization of a DWDM system comprising the steps of:

a) measuring and calculating, respectively, a gain spectrum characteristic curve of an optical power booster amplifier unit and a loss spectrum characteristic curve of a loss device having related wavelengths with the optical power booster amplifier unit in the DWDM system;

b) subtracting the loss spectrum characteristic curve from the gain spectrum characteristic curve, then taking the complement curve of the obtained difference curve as a loss characteristic target curve of a GFF;

c) setting in the optical power booster amplifier unit a GFF having loss characteristic curve coinciding with the loss characteristic target curve.

2. The method according to claim 1 further comprising the steps of dividing, in advance, the whole DWDM system into more than one independent unit at least having the optical power booster amplifier unit; and calculating, respectively, the GFF loss characteristic target curves of each independent unit itself.

3. The method according to claim 1 wherein the optical power booster amplifier unit is an EDFA.

4. The method according to claim 1 wherein the loss device with relating wavelengths is a transmission fiber, or a dispersion compensating module or their combination.

5. The method according to claim 4 wherein the dispersion compensating module includes dispersion compensating fibers.

* * * * *